UNITED STATES PATENT OFFICE.

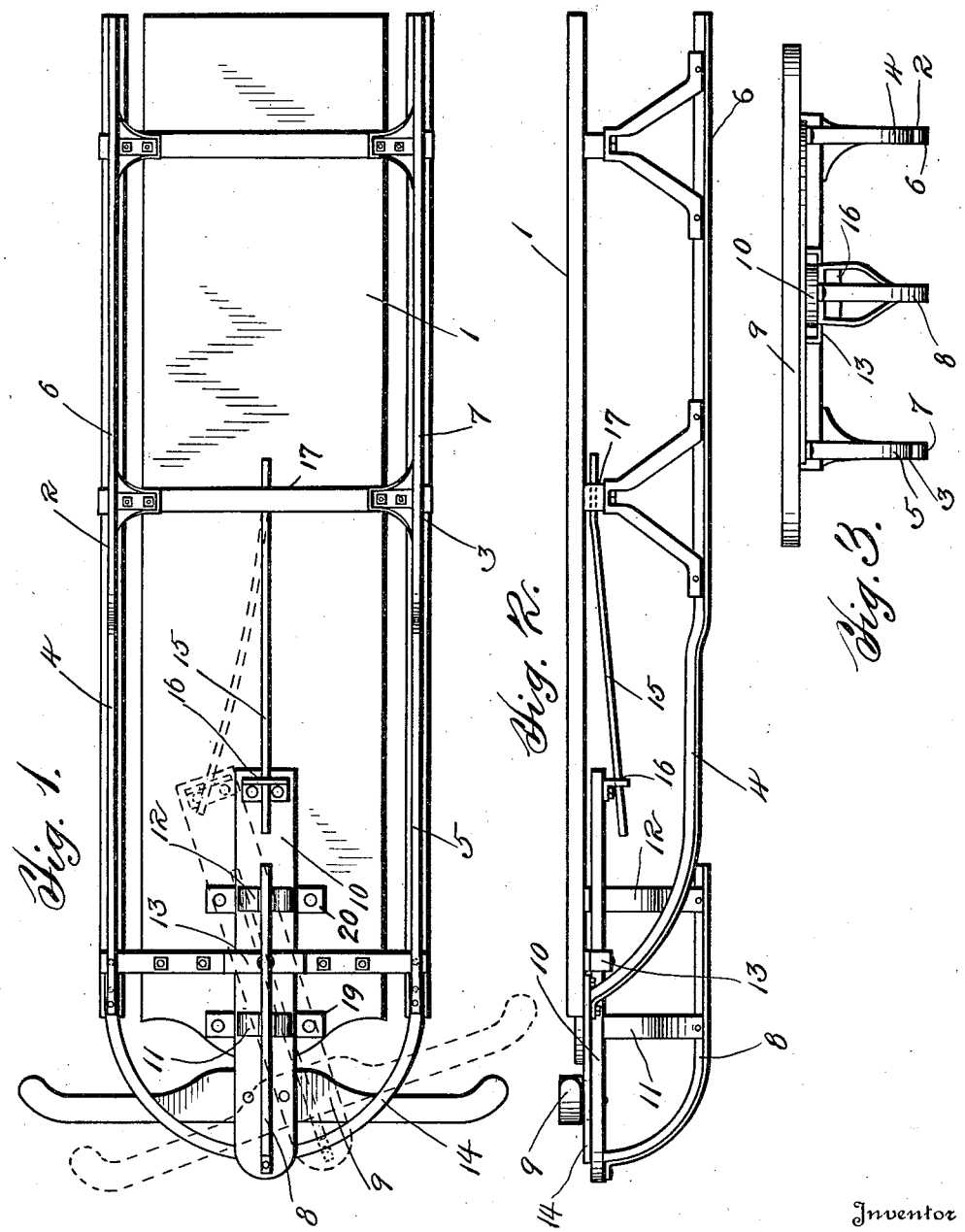

DANIEL Y. HALLOCK, OF YORK, PENNSYLVANIA.

BOB-SLED.

1,212,212. Specification of Letters Patent. Patented Jan. 16, 1917.

Application filed May 18, 1916. Serial No. 98,476.

*To all whom it may concern:*

Be it known that I, DANIEL Y. HALLOCK, a citizen of the United States, residing at York, in the county of York and State of Pennsylvania, have invented certain new and useful Improvements in Bob-Sleds, of which the following is a specification.

This invention relates to improvements in bobsleds and has for its object to provide means for facilitating the guiding of the sled.

Another object of the invention is to provide a sled having horizontal runners different portions of which are on different planes.

Still another object of the invention is to provide a sled having fixed runners different portions of which are on different planes in combination with a pivotally movable runner whereby the guiding of the sled is facilitated.

With the above and other objects in view, I have invented the device illustrated in the accompanying drawings in which—

Figure 1 is a bottom plan view of my improved sled, Fig. 2 is a side elevational view thereof, and Fig. 3 is a front elevational view thereof.

Like reference characters indicate like parts throughout the following specification and in the several views in the drawings in which 1 is a sled having fixed side runners 2 and 3 the forward portions 4 and 5 of which are on a plane slightly above the plane of the rear or main portion 6 and 7 thereof. A pivotally mounted runner 8 is provided on the forward end of the sled which may be guided through means of the steering bar 9 fixed to the bearing member 10 to which the runner 8 is connected by the standards 11 and 12. The member 10 is pivoted in the recessed transverse bar 13. A semi-circular member 14 provides a side support for the opposite ends of the steering bar 9. The main portion of the runner 8 is on a common plane with the rear portions 6 and 7 of the runners 2 and 3. A resilient rod 15 has movable connection with the bracket 16 fixed on the rear end of the bearing member 10 and fixed connection with the frame member 17 whereby the member 10, and consequently the runner 8 is held normally parallel with the runners 2 and 3.

Normally the raised ends 4 and 5 of the runners 2 and 3 are held above the surface upon which the sled operates, and yet they guard against liability of the sled upsetting from an excess of side weight on front end when in use. The preponderance of weight is usually on the rear end of the coaster; thus, by the usual straight bearing of the main runners the course of a coaster is not readily deflected; while with my construction, the third runner being short and having within itself the forward traction power; the steering is easy and prompt, thus avoiding much of the perils of coasting. 19 and 20 are chafing irons against which the member 10 is movable.

Having now described my invention that which I claim to be new and desire to procure by Letters Patent is:—

1. In a bobsled having a pair of runners each of which is stepped, the forward portion being on a higher horizontal plane than the rear portion.

2. In a bobsled having a pair of runners each of which is stepped, the forward portion being on a higher horizontal plane than the rear portion and an intermediate pivoted runner.

In testimony whereof I affix my signature in the presence of two witnesses.

DANIEL Y. HALLOCK.

Witnesses:
R. F. MORNINGSTAR,
P. W. GRUVER.